(12) United States Patent
Heitplatz et al.

(10) Patent No.: US 9,221,623 B2
(45) Date of Patent: Dec. 29, 2015

(54) SUCTION GRIPPER APPARATUS

(71) Applicant: BEUMER GmbH & Co. KG, Beckum (DE)

(72) Inventors: Heino Heitplatz, Drensteinfurt (DE); Ludger Pölling, Wadersloh-Diestedde (DE)

(73) Assignee: Beumer GMBH & Co. KG, Beckum (DE)

( * ) Notice: Subject to any disclaimer, the term of this patent is extended or adjusted under 35 U.S.C. 154(b) by 0 days.

(21) Appl. No.: 14/519,988

(22) Filed: Oct. 21, 2014

(65) Prior Publication Data

US 2015/0108779 A1   Apr. 23, 2015

(30) Foreign Application Priority Data

Oct. 23, 2013   (DE) .......................... 10 2013 017 728

(51) Int. Cl.
*B65G 47/91* (2006.01)

(52) U.S. Cl.
CPC ...................................... *B65G 47/91* (2013.01)

(58) Field of Classification Search
CPC .... B65G 47/91; B25J 15/0616; B25J 15/0683
USPC ............ 294/183, 185, 189, 65; 414/627, 737; 901/40
See application file for complete search history.

(56) References Cited

U.S. PATENT DOCUMENTS

| | | | | |
|---|---|---|---|---|
| 4,674,784 | A * | 6/1987 | Wooley | 294/186 |
| 7,665,783 | B2 * | 2/2010 | Nishio | 294/188 |
| 8,025,323 | B2 * | 9/2011 | Ransom | 294/65 |
| 8,256,813 | B2 * | 9/2012 | Hsieh et al. | 294/183 |
| 8,262,146 | B2 * | 9/2012 | Stoppel | 294/183 |
| 8,960,749 | B2 * | 2/2015 | Fukano et al. | 294/188 |
| 2011/0166704 | A1 * | 7/2011 | Hashimoto | 700/250 |
| 2013/0038077 | A1 * | 2/2013 | Hummeler et al. | 294/183 |
| 2013/0088029 | A1 * | 4/2013 | Rocco | 294/183 |
| 2014/0175818 | A1 * | 6/2014 | Lei et al. | 294/188 |

FOREIGN PATENT DOCUMENTS

| | | | | | |
|---|---|---|---|---|---|
| DE | 3226834 | A1 * | 1/1984 | | B65G 47/91 |
| DE | 3726289 | A1 * | 12/1988 | | B65G 47/91 |
| DE | 3923672 | A1 * | 5/1990 | | B25J 15/06 |
| DE | 9309713 | U1 * | 10/1993 | | B65G 47/91 |
| DE | 29510320 | U1 * | 9/1995 | | B65G 47/91 |

* cited by examiner

*Primary Examiner* — Gabriela Puig
(74) *Attorney, Agent, or Firm* — Ganz Pollard LLC

(57) ABSTRACT

A suction gripper apparatus with a suction head, which is mounted with at least one elastic mounting member on a working head of an actuation device, the suction head having an elastic suction cup which possesses a suction body and a suction lip forming an open edge portion of the suction body and running in a suction plane, wherein the suction head possesses a retaining plate connected to the suction cup and surrounding it like a ring and having a flat contact surface running in a contact plane parallel to the suction plane.

17 Claims, 5 Drawing Sheets

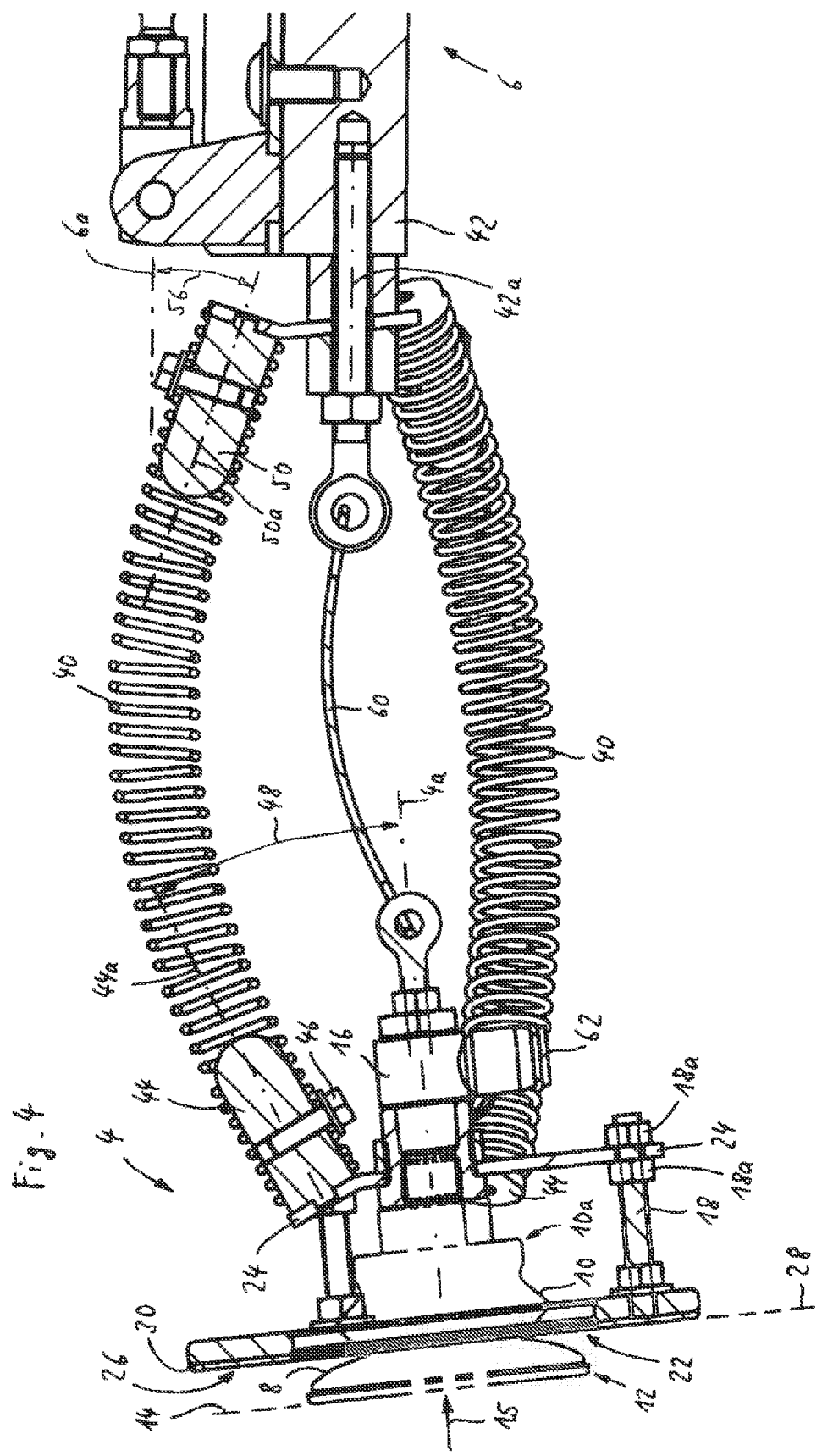

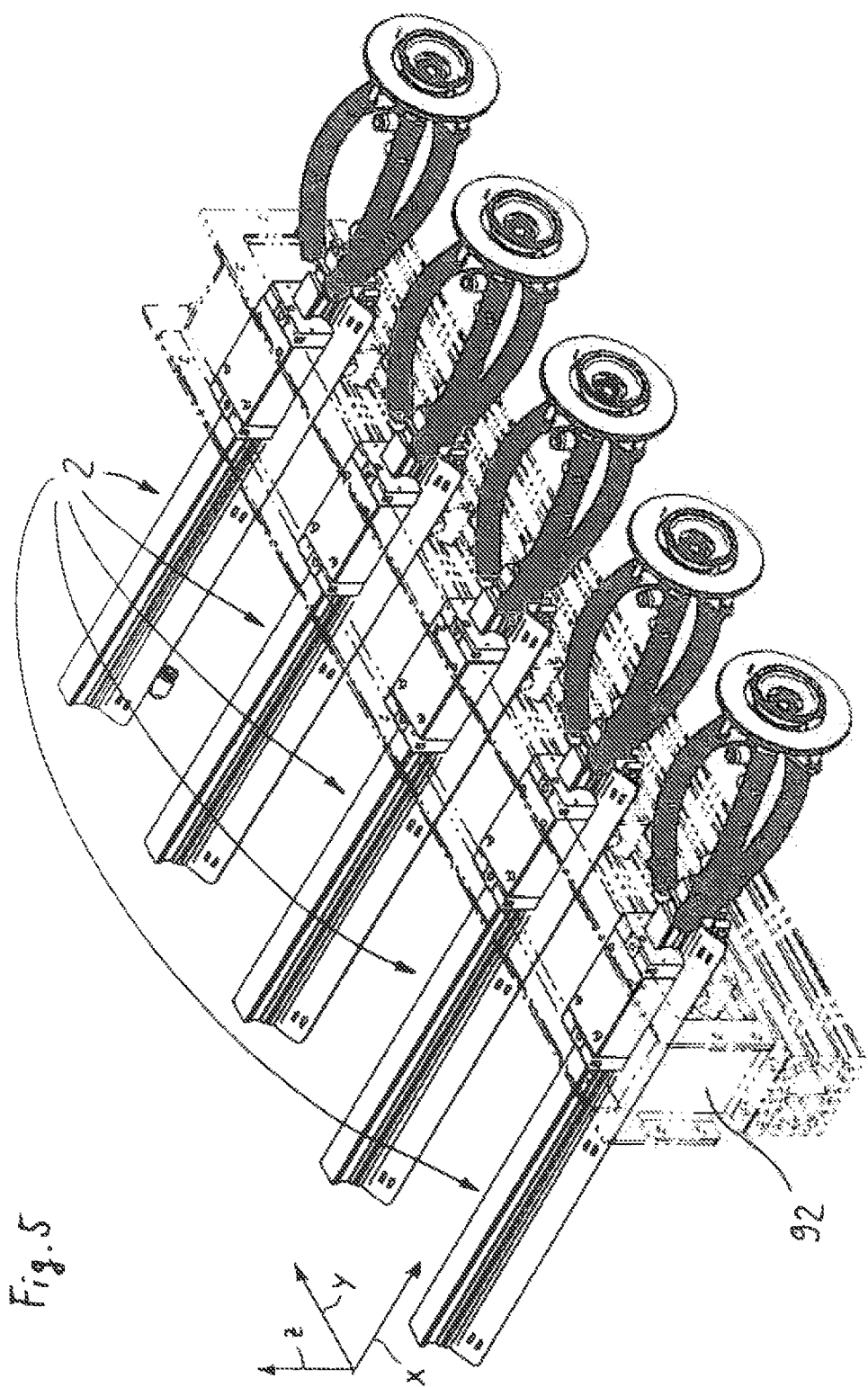

SUCTION GRIPPER APPARATUS

BACKGROUND

The invention relates to a suction gripper apparatus with a suction head which is mounted with an elastic mounting member on a working head of an actuation device, the suction head having an elastic suction cup which possesses a suction body and a suction lip forming an open edge portion of the suction body and running in a suction plane.

A suction gripper apparatus of this kind, such as that known from DE 32 26 834 A1, can advantageously be used for unloading load items such as parcels from interchangeable containers or other transport units.

Gripper apparatuses are known for unloading parcels from interchangeable containers partially or fully automatically, though they suffer from the disadvantage that the parcels are mainly grabbed individually and deposited on a conveyor belt. It is difficult to grab parcels lying crookedly.

SUMMARY

The problem of the invention therefore consists in making a suction gripper apparatus with which even load items or parcels lying crookedly can also be grabbed advantageously and with which even heavy load items can be held reliably, without the risk of the suction cup peeling off and becoming detached from the surface of a load item that has been gripped.

This problem is solved in accordance with the invention by a suction gripper apparatus with a suction head, which is mounted with at least one elastic mounting member on a working head of an actuation device, the suction head having an elastic suction cup which possesses a suction body and a suction lip forming an open edge portion of the suction body and running in a suction plane, it being contemplated in accordance with the invention that the suction head possesses a retaining plate connected to the suction head and surrounding it like a ring and having a flat contact surface running in a contact plane parallel to the suction plane. The suction body has an internal suction cavity. The retaining plate is preferably configured rigidly. It is appropriate for the suction and contact planes to run perpendicularly to a suction direction of the suction head, which is aligned along the longitudinal axis of the suction head. The contact surface is conveniently annular and surrounds the suction lip, spaced apart from it, it being advantageous for a space linked to the ambient air to be provided between the contact surface and the suction cup and the suction lip.

In a non-pressurised rest state of the suction cup, the suction lip, which, like the suction cup, is configured elastically and is preferably integral with it, may lie in the contact plane or project above it opposite the suction direction. In a suction state, when there is a partial vacuum in the suction cavity, a withdrawal force acting in the suction direction can be applied to the suction cup, for example when a surface of a load item is resting against the suction lip, and the suction lip can be moved into or behind the contact plane because of the elasticity of the suction body.

There is no connection between the contact surface and the suction cavity of the suction cup, so that no partial vacuum is applied to the contact surface either in the withdrawn or in the suction state, but instead it is always subjected to ambient pressure.

It is convenient for the suction lip to be circular or oval and for the retaining plate to have a circular or oval opening the diameter or size of which is the same as or greater than an outer diameter or size of the suction lip. The space may be annular in this case.

The suction body is preferably attached at an end opposite the suction lip to a connector part which is fixed to the retaining plate. Connected to the connector part there may be a flexible suction line communicating with a suction means. The connector part is preferably cylindrical and made of plastic or metal for example, and the suction body may be pushed onto the connector part and fixed to it.

The retaining plate may be attached to the connector part.

Although a distance between the suction plane and the contact plane is preferably fixed unchangingly, it may be contemplated that the retaining plate is adjustably attached to the connector part, and said distance may be changeable, even when the suction apparatus is in operation.

In the region of the contact surface, the retaining plate preferably consists of a material or is coated in that region with a material that has a high coefficient of friction, such as rubber.

The suction head can be mounted on the working head of the actuation device with a plurality of elastic mounting members, with a first end of each mounting member being connected to the suction head and a second end of each mounting member being connected to the working head. Relative to a neutral position, in which no external forces act on the retaining plate or the suction head, apart from their own weight, the retaining plate may be pivotable by at least 10°, 20°, 30°, 45°, 60°, 90° or 120° in every direction against an elastic restoring force of the at least one mounting member.

It is preferably contemplated that the mounting members are coil springs, where in particular three mounting members in the form of coil springs may be provided, the first ends of which being located at corners of an equilateral triangle at the suction head and the second ends of which being located at corners of an equilateral triangle at the working head. It may be contemplated in this context that the first ends of the coil springs diverge away from the suction head when seen in the suction direction. It may also be contemplated that the second ends of the coil springs diverge away from the working head. With such an arrangement of three coil springs, they preferably run with rotational symmetry with respect to a longitudinal axis of the suction gripper apparatus, which is identical to the longitudinal axis of the suction head, the individual coil springs being arranged so as to be offset to one another by 120° in the circumferential direction relative to the longitudinal axis.

It is appropriate for all the coil springs to be of the same length and to have the same spring rate, though coil springs of different lengths and/or coil springs with different spring rates may be used in order to ensure that in a neutral position, when there are no external forces acting on the suction head, the longitudinal axis of the suction head is horizontal. This avoids any undesirable tilting of the suction plane deviating from the vertical in the rest state without any load item being held on the suction head. It goes without saying that the neutral position can be any predetermined position of the suction plane, even deviating from a vertical position, such as a horizontal orientation of the suction plane.

Instead of three mounting members, two, four or more mounting members may be provided, whose mutually spaced angle at circumference with respect to the longitudinal axis of the suction head or the suction gripper apparatus is preferably the same size.

The suction head may be connected to the actuation device by a non-expandable tension member, such as a chain or cable, especially a steel cable. This avoids excessive stretching of the at least one elastic mounting member.

The suction body of the suction cup may have alternately converging and diverging frustoconical portions which permit a telescopic change in the length of the suction body and in particular, when a partial vacuum is applied and a substantially sealing surface of a load item is resting against the suction lip, permits a telescopic shortening of the suction body compared to a non-pressurised rest state.

More than one suction head can be attached to a common actuation device, so that simultaneous actuation of all the suction heads in the same direction is possible. It is preferable for the longitudinal axes of all the suction heads to be parallel to one another in the neutral position. The suction planes of all the suction heads may lie in a common suction plane in the neutral position of the suction heads.

Although the actuation device may enable positioning of the working head in one, two or three spatial directions perpendicular to one another and/or may enable twisting of the working head about one, two or three axes of rotation perpendicular to one another, such complex positioning of the suction head is not necessary as a rule, because the elastic attachment of the suction head to the working head causes automatic orientation of the suction head and the suction lip with respect to a load item to be grabbed. It is therefore sufficient as a rule if the actuation device can be extended and retracted in a linear manner and can be locked in a selected extended position. The actuation device is preferably configured as a single or double-action pneumatic or hydraulic piston/cylinder unit. It may be contemplated in this connection that pressure is applied to the piston/cylinder unit independently of any extension position. Alternatively, the actuation device may comprise a mechanical actuation spring, such as a coil spring.

It is convenient for the actuation device to comprise a linear guide in order to be able to absorb transverse forces, such as weight forces of a load item held by suction. An actuation direction of the actuation device can be identical to the suction direction of the suction head or be parallel to it when the suction head is in a neutral position.

It may be contemplated that one or more adjacent further suction gripper apparatuses with respective suction heads and actuation means are provided, wherein all the actuation means may be disposed on a common gripper frame. The gripper frame can be positionable under the control of a gripper handling means, specifically such that it can be moved in one, two or three spatial directions perpendicular to one another and/or pivoted about one, two or three axes of rotation perpendicular to one another. It is preferably contemplated that the gripper frame can be pivoted about a horizontal swivelling axis and moved along a horizontal working direction arranged transversely to the swivelling axis. In this case, the actuation means are conveniently configured so that they can be extended and retracted linearly parallel to the working direction.

A partial vacuum can be applied to each suction cup of a suction gripper apparatus individually or to all the suction cups simultaneously, or can be connected to a suction means, where the time and suction intensity of each suction cup can be controlled individually.

An essential element of the invention consists in the arrangement of the annular retaining plate enclosing the suction cup or the suction lip which serves, on the one hand, to align the suction lip parallel to the surface of a load item to be gripped, or in other words to align the suction direction of the suction cup perpendicularly to the (local) surface of the load item. Secondly, the retaining plate serves as a counter-bearing for a surface of a load item when the latter is drawn to the suction cup. This prevents the suction lip from being peeled off by transverse forces. In addition, a frictional force is generated on the contact surface of the retaining plate. Furthermore, the contact plate protects the sensitive suction lip of the suction cup from damage.

BRIEF DESCRIPTION OF THE DRAWINGS

The invention will now be explained by describing worked embodiments, reference being made to a drawing, in which FIG. 4 shows an enlarged section view of the suction gripper apparatus of FIG. 1 in the region of the suction head and of the working head of the actuation device, and FIG. 5 shows a perspective view of a plurality of suction gripper apparatuses disposed on a gripper frame,

DETAILED DESCRIPTION

Figure 1:
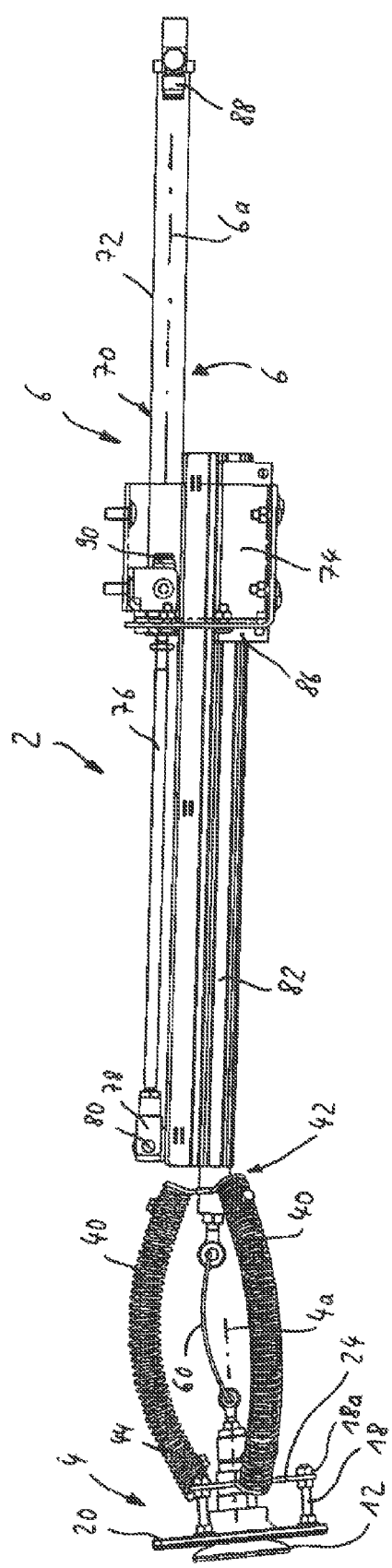
FIG. 1 shows a side view of a suction gripper apparatus of the invention.
Figure 2:
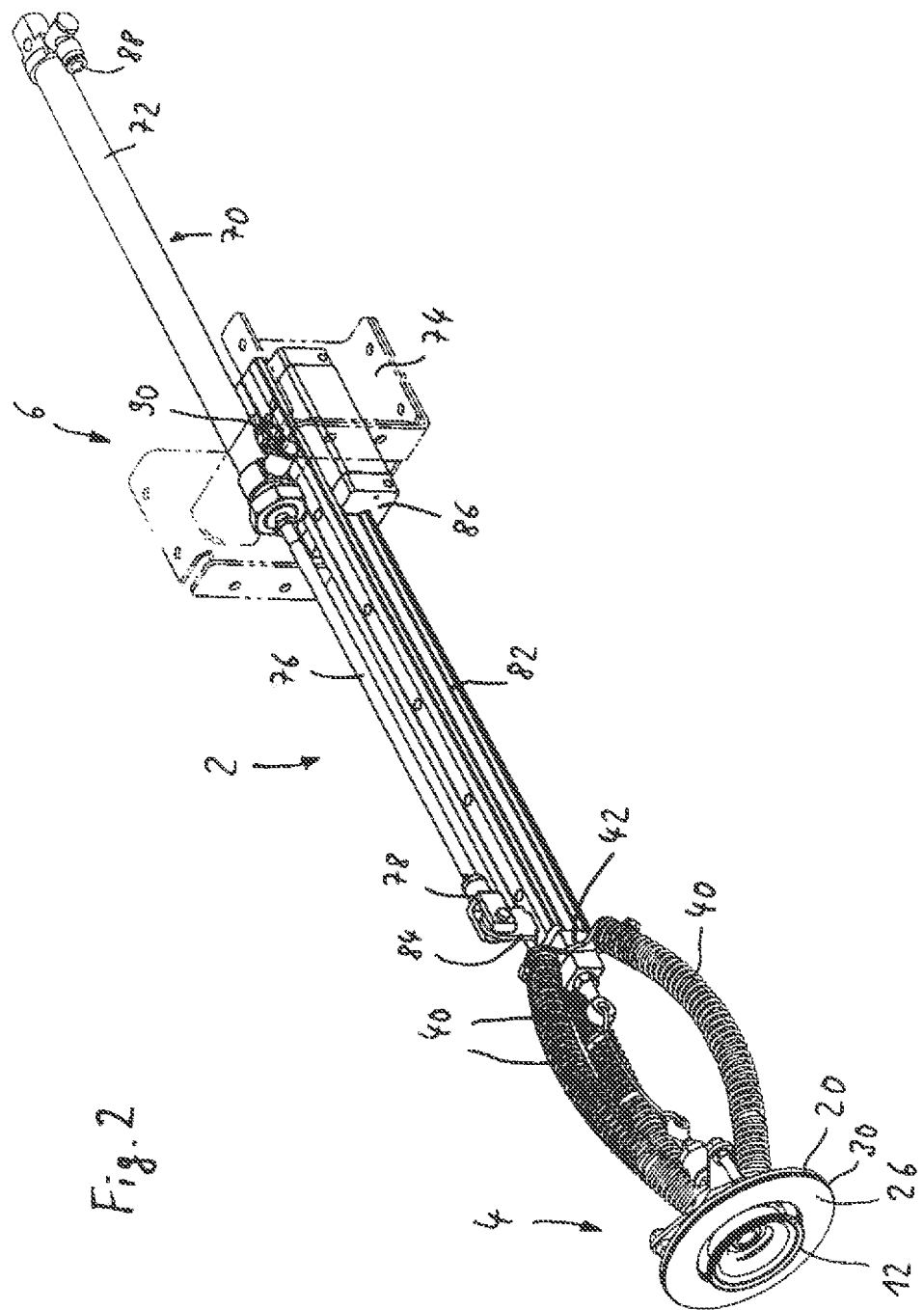
FIG. 2 shows a perspective view of the suction gripper apparatus of FIG. 1.
Figure 3:
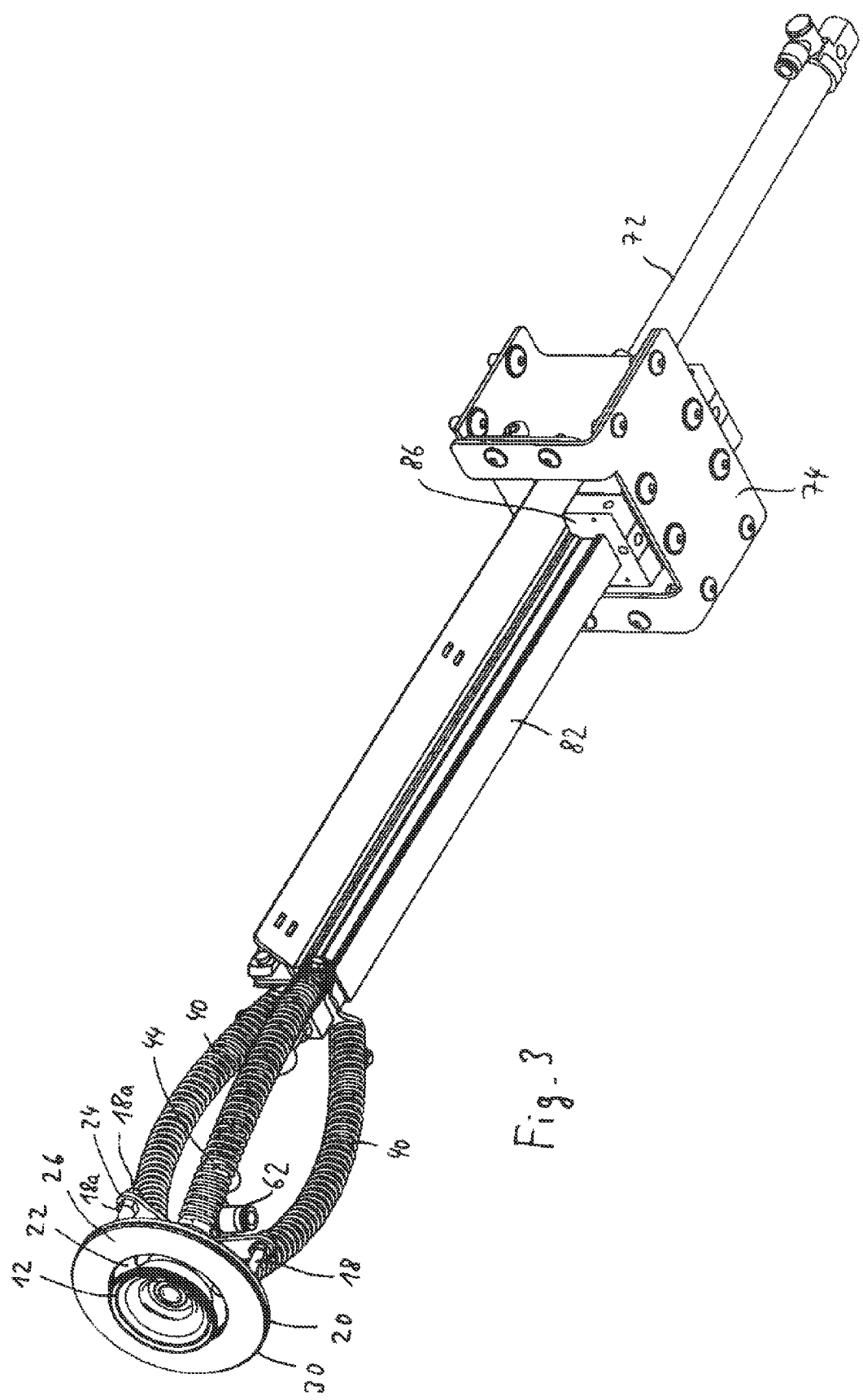
FIG. 3 shows a perspective view of the suction gripper apparatus of FIG. 1 from a different angle.

FIGS. 1 to 4 show different views of a suction gripper apparatus 2 of the invention with a suction head 4 attached to an actuation device 6. The suction head 4 has an elastic suction cup 8 with a suction body 10 and a suction lip 12 forming an open edge portion of the suction body 10. The suction lip 12 extends in a circle in a suction plane 14 and perpendicularly to a suction direction 15. The suction cup 8 is mounted on a cylindrical connector part 16 by an end 10a of the suction body 10 opposite the suction lip 12. The connector part 16 is connected by three attachment members in the form of stay bolts 18 to an annular retaining plate 20 which surrounds the suction cup 8 annularly. The retaining plate 20 has a circular opening 22 arranged concentrically to the suction lip 12, which is likewise circular and the diameter of which is at least as great as an outer diameter of the suction lip 12. The said stay bolts 18 are firmly joined to the retaining plate 20 and are joined to the connector part 16 by a ring-shaped or star-shaped connector member 24.

On its side facing away from the actuation device 6, the retaining plate 20 forms a contact surface 26, which extends in a contact plane 28 running parallel to the suction plane 14. In the region of the contact surface 26, the retaining plate 20 is provided with a rubber coating 30 which has a high coefficient of friction at the contact surface 26. The suction lip 8, the suction body 10, the contact plate 20 and the connector part 16 are arranged concentrically with respect to a central longitudinal axis 4a of the suction head 4.

The opening 22 forms a space between the retaining plate 20 and the suction lip 12 or the suction cup 8, which is always in communication with ambient air. A partial vacuum inside the suction cup thus cannot continue as far as the retaining plate 20 or the contact surface 26.

The three stay bolts 18 have adjustable securing nuts 18a which allow the connector member 24 to be adjusted in such a way that the contact plane 28 can be set parallel to the suction plane 14 of the suction lip 12, and for a desired distance to be set between the suction and contact planes in the unloaded, non-pressurised state.

The suction cup 8 can be connected in a controlled manner to a vacuum source via a union 62 by means of a suction line (not shown), in order to cause a suction flow through the suction cup 8 when needed and, when the suction lip 12 is resting against a surface of a load item to be grabbed, to build up a vacuum in the suction cup. The suction line can be joined to the connector part 16, which for this purpose may be hollow inside and can be provided with the union 62.

Alternatively, it is possible to configure the suction cup to act passively, without any connection to a vacuum source, wherein, when the suction lip is pressed against a surface of a load item to be grabbed, air escapes from the air-tight suction cup and causes a suction effect when the suction cup is retracted.

The suction head 4 is flexibly joined to a working head 42 of the actuation device 6 by three mounting members in the form of coil springs 40. For this purpose, there are disposed on the suction head 4, especially on the connector member 24 arranged between the retaining plate 20 and the connector part 16, three cylindrical or slightly conical attachment members 44, on each of which an end portion of a coil spring 40 is mounted.

FIG. 4 shows cylindrical attachment members 44, each with an attachment screw 46. The attachment members 44 are arranged at a slant with respect to a longitudinal axis 4a of the suction head 4, such that they diverge when seen in the suction direction 15, so that there is an angle 48 between a longitudinal axis 44a of an attachment member 44 and the longitudinal axis 4a of the suction head 4 ranging between for example 10° and 45°, especially about 30°. Seen in the circumferential direction about the longitudinal axis 4a, the attachment members 44 are conveniently arranged with the same angular distances, in the present case, with three coil springs, with a circumferential angular distance of 120°.

A corresponding attachment of the coil springs 40 is provided on the working head 42. Disposed on the working head 42 are three attachment members 50, whose longitudinal axes 50a are positioned at a slant with respect to the longitudinal axis 6a of the actuation device 6. The longitudinal axes 50a have the same mutual circumferential angular distances with respect to the longitudinal axis 6a, i.e. with three coil springs 40 the circumferential angular distances are 120°. An angle 56 between a longitudinal axis 50a of an attachment member 50 and the longitudinal axis 6a of the actuation device 6 may lie between 10° and 45° and is, for example, approx. 30°, the arrangement being divergent when seen in the direction of the suction head 4.

The three coil springs 40 may be identical, but also different. For example, the coil springs may be of different lengths (in the unexpanded state). Alternatively or in addition, the coil springs may have different spring rates or spring stiffnesses. With these measures, it is possible to balance out the weight of the suction head 4 itself in such a way that in the rest state, without any load imposed by a load item picked up, the longitudinal axis 4a of the suction head runs parallel to an actuation device or the longitudinal axis 6a of the actuation device, such as horizontally, without the weight of the suction head itself leading to any unwanted tilting relative to the horizontal or the longitudinal axis 6a.

In order to ensure that when a heavy load item is picked up, the coil springs 40 do not stretch excessively or kink, a means is disposed between the suction head 4 and the working head 42 to limit the distance between the suction head 4 and the working head 42, said means being configured by an unexpandable tension member 60 in the form of a steel cable in the embodiment illustrated. Since it may in some cases be undesirable also to limit the angular deflection of the suction head 4 relative to the actuation device 6, i.e. an angle between the longitudinal axis 4a of the suction head 4 and a longitudinal axis 42a of the working head 42 which is parallel to the longitudinal axis 6a of the actuation device 6, either the tension member 60 can be configured such that it merely permits a particular maximum angular deflection, such as 90°, or an additional means for limiting the angle between the longitudinal axes 4a, 42a can be provided.

In the embodiment illustrated, the actuation device 6 comprises a pneumatically operated piston/cylinder unit 70, with a cylinder 72 mounted on an assembly unit 74, and a piston rod 76 actuated through the cylinder 72. Mounted at a front end of the piston rod 76 is a clevis 78, which is coupled by means of a mounting bolt 80 to an actuating lug 84 joined to a runner 82. The runner 82, together with a guide rail 86 attached to the assembly unit 74, forms a linear guide, the direction of movement of which is identical to the longitudinal axis 6a of the actuation device 6 and the working direction of the piston/cylinder unit 70 and thus also forms an actuation direction of the actuation device 6.

The cylinder 72 is configured to be double-action, wherein the introduction of compressed air into a first union 88 causes the piston rod 76 to be extended and thus the working head 42 and suction head 4 to move substantially opposite the suction direction 15, whereas applying compressed air to a second union 90 causes a retracting movement of the piston rod 76 and thus causes the working head 42 and suction head 4 to move substantially in the suction direction 15.

While the suction cups 8 or suction heads 4 are moving towards the load items to be grabbed, the actuation means is/are advantageously extended with a pressure limited to a predetermined value in order to limit the pressing force of a suction cup or suction head and to prevent the coil springs from kinking if the pressing force were too great.

FIG. 5 illustrates an arrangement in which a plurality of—in this example five—suction gripper apparatuses 2 are disposed on a gripper frame 92 with respective suction heads 4 and actuation means 6. The gripper frame 92 can be mounted on a handling means (not shown) and positionable with the latter in a controlled manner, for example by being moved in one, two or three spatial directions perpendicular to one another and/or pivoted about one, two or three axes of rotation perpendicular to one another. The three directions of movement are indicated in FIG. 5 by x (parallel to the actuation direction of the actuation means 6 or the longitudinal axes 6a), y and z (vertical).

The invention claimed is:

1. A suction gripper apparatus with a suction head which is mounted with at least one elastic mounting member on a working head of an actuation device, the suction head having an elastic suction cup which possesses a suction body and a suction lip forming an open edge portion of the suction body and running in a suction plane, characterised in that the suction head possesses a retaining plate connected to the suction cup and surrounding it like a ring and having a flat contact surface running in a contact plane parallel to the suction plane.

2. The suction gripper apparatus as claimed in claim 1, characterised in that the suction plane and the contact plane run perpendicularly to a suction direction of the suction head, which is aligned along a longitudinal axis of the suction head.

3. The suction gripper apparatus as claimed in claim 1, characterised in that in a non-pressurised rest state of the suction cup, the suction lip lies in the contact plane or projects above it opposite the suction direction.

4. The suction gripper apparatus as claimed in claim 1, characterised in that the suction lip is circular or oval and the retaining plate has a circular or oval opening, the diameter or size of which is the same as or greater than an outer diameter of the suction lip.

5. The suction gripper apparatus as claimed in claim 1, characterised in that the suction body is attached at an end opposite the suction lip to a connector part which is fixed to the retaining plate.

6. The suction gripper apparatus as claimed in claim 1, characterised in that in the region of the contact surface, the retaining plate consists of a material or is coated in that region with a material that has a high coefficient of friction, especially rubber.

7. The suction gripper apparatus as claimed in claim 1, characterised in that the suction head is mounted on the working head of the actuation device with a plurality of elastic mounting members, with a first end of each mounting member being connected to the suction head and a second end of each mounting member being connected to the working head.

8. The suction gripper apparatus as claimed in claim 7, characterised in that the mounting members are coil springs.

9. The suction gripper apparatus as claimed in claim 8, characterised in that three mounting members in the form of coil springs are provided, the first ends of which are located at points of an equilateral triangle at the retaining plate.

10. The suction gripper apparatus as claimed in claim 9, characterised in that the first ends of the coil springs diverge away from the retaining plate, and that the second ends of the coil springs diverge away from the working head.

11. The suction gripper apparatus as claimed in claim 8, characterised in that second ends of the coil springs are located at corners of an equilateral triangle at the working head.

12. The suction gripper apparatus as claimed in claim 1, characterised in that the suction head is connected to the working head by a non-expandable tension member.

13. The suction gripper apparatus as claimed in claim 1, characterised in that the suction body of the suction cup has alternately converging and diverging frustoconical portions.

14. The suction gripper apparatus as claimed in claim 1, characterised in that a suction head or a number of adjacent suction heads are attached to one or a common actuation device.

15. The suction gripper apparatus as claimed in claim 14, characterised in that the actuation device comprises a pneumatically operated piston/cylinder unit, to which a constant pressure, which can be limited to a predetermined value, is applied independently of any extension position.

16. The suction gripper apparatus as claimed in claim 1, characterised in that one or more adjacent further suction gripper apparatuses with respective suction heads and actuation means are provided, wherein all the actuation means are disposed on a common gripper frame.

17. The suction gripper apparatus as claimed in claim 1, characterised in that the suction cup is configured to act passively or can be connected in a controlled manner to a vacuum source.

* * * * *